(12) United States Patent
Zhu (10) Patent No.: US 12,328,756 B2
(45) Date of Patent: Jun. 10, 2025

(54) DETECTION METHOD, DEVICE, AND STORAGE MEDIUM FOR DETECTING CONTROL SIGNALING

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 646 days.

(21) Appl. No.: 17/613,827

(22) PCT Filed: May 28, 2019

(86) PCT No.: PCT/CN2019/088857
§ 371 (c)(1),
(2) Date: Nov. 23, 2021

(87) PCT Pub. No.: WO2020/237510
PCT Pub. Date: Dec. 3, 2020

(65) Prior Publication Data
US 2022/0240314 A1  Jul. 28, 2022

(51) Int. Cl.
*H04W 74/0808* (2024.01)
*H04W 72/0453* (2023.01)
*H04W 74/00* (2009.01)
*H04W 74/08* (2024.01)

(52) U.S. Cl.
CPC ... *H04W 74/0808* (2013.01); *H04W 72/0453* (2013.01); *H04W 74/006* (2013.01); *H04W 74/0866* (2013.01)

(58) Field of Classification Search
CPC .............................. H04L 5/005; H04L 5/0044
See application file for complete search history.

(56) References Cited

U.S. PATENT DOCUMENTS

| | | | |
|---|---|---|---|
| 2015/0189574 A1* | 7/2015 | Ng | H04W 52/245 370/254 |
| 2016/0100382 A1* | 4/2016 | He | H04L 5/001 370/329 |
| 2018/0027493 A1 | 1/2018 | Li et al. | |
| 2018/0192442 A1 | 7/2018 | Li et al. | |

(Continued)

FOREIGN PATENT DOCUMENTS

| | | |
|---|---|---|
| CN | 105992373 A | 1/2017 |
| CN | 109155702 A | 1/2019 |
| EP | 3836448 A1 | 6/2021 |

OTHER PUBLICATIONS

European Patent Application No. 19931257.0 extended Search and Opinion dated May 17, 2022, 8 pages.

(Continued)

*Primary Examiner* — Joseph E Avellino
*Assistant Examiner* — Maryam Emadi
(74) *Attorney, Agent, or Firm* — Cozen O'Connor (57) ABSTRACT

A method for detecting control signaling includes: receiving downlink control information, the downlink control information includes an information field, and the information field is configured to indicate a detection location of the control signaling in an unlicensed frequency band; and receiving the control signaling at the detection location in the unlicensed frequency band according to the information field.

16 Claims, 5 Drawing Sheets

(56) References Cited

U.S. PATENT DOCUMENTS

2019/0116614 A1* 4/2019 Li .................... H04W 76/27
2020/0314856 A1* 10/2020 Bang .................. H04L 5/0094

OTHER PUBLICATIONS

Indian Patent Application No. 202147059772 dated Jul. 14, 2022, 6 pages.
PCT/CN2019/088857, English translation of the International Search Report dated Feb. 12, 2020, 2 pages.

* cited by examiner

DETECTION METHOD, DEVICE, AND STORAGE MEDIUM FOR DETECTING CONTROL SIGNALING

CROSS-REFERENCE TO RELATED APPLICATIONS

This application is a U.S. national phase of International Application No. PCT/CN2019/088857, filed on May 28, 2019, the entire contents of which are incorporated herein by reference.

TECHNICAL FIELD

The present disclosure relates to a field of communications, and more particularly, to a method, and a device for communication over an unlicensed frequency band.

BACKGROUND

In a process of wireless communication between a terminal and a base station, the terminal is often required to detect the downlink control information (DCI) sent by the base station in the physical downlink control channel (PDCCH), and then receive data from a physical downlink shared channel (PDSCH) according to an indication of downlink control signaling. A detection location of the DCI in the PDCCH is pre-configured by the base station for the terminal, or pre-defined by the communication protocol.

The use of unlicensed frequency bands (UFB) for the communication needs of terminals has been introduced in the $5^{th}$ generation mobile communication technology (5G) system. When the base station sends the downlink control signaling to the terminal through the unlicensed frequency band, the base station needs to use a listen before talk (LBT) process to detect the channel status, and can occupy the channel when the channel status is idle.

SUMMARY

According to an aspect, a method for detecting control signaling is provided. The method includes: receiving downlink control information, the downlink control information includes an information field, and the information field is configured to indicate a detection location of the control signaling in an unlicensed frequency band; and receiving the control signaling at the detection location in the unlicensed frequency band according to the information field.

According to another aspect, a method for detecting control signaling is provided. The method includes: sending downlink control information. The downlink control information includes an information field, the information field is configured to indicate a detection location of the control signaling in an unlicensed frequency band, and the detection location is a possible sending location of the control signaling in the unauthorized frequency band.

According to another aspect, a terminal is provided. The terminal includes: a processor; and a transceiver coupled to the processor. The processor is configured to load and execute executable instructions to implement the method for detecting control signaling according to above embodiments of the disclosure.

According to another aspect, an access network device is provided. The access network device includes: a processor; and a transceiver coupled to the processor. The processor is configured to load and execute executable instructions to implement the method for detecting control signaling according to above embodiments of the disclosure.

According to another aspect, a non-transitory computer-readable storage medium is provided. The storage medium has stored therein at least one instruction, at least one program, a code set, or an instruction set. The at least one instruction, the at least one program, the code set, or the instruction set is loaded and executed by a processor to implement the method for detecting control signaling according to above embodiments of the disclosure.

BRIEF DESCRIPTION OF THE DRAWINGS

In order to explain the technical solutions in embodiments of the present disclosure more clearly, the accompanying drawings described in the embodiments will be briefly introduced below. Obviously, the accompanying drawings described below are only some embodiments of the present disclosure. Those skilled in the art may obtain other drawings from these drawings without creative work.

DETAILED DESCRIPTION

Embodiments of the disclosure are further described in combination with the accompanying drawings in order to make the purpose, the technical solution and advantages of the disclosure apparent.

In a process of wireless communication between a terminal and a base station, the terminal will detect the downlink control information (DCI) sent by the base station in the physical downlink control channel (PDCCH), and then receive data from a physical downlink shared channel (PDSCH) according to indication of downlink control signaling. A detection location of the DCI in the PDCCH is pre-configured by the base station for the terminal, or pre-defined by the communication protocol.

In order to meet service requirements, the use of unlicensed frequency bands (UFB) is introduced in the 5th generation mobile communication technology (5G) system. On the unlicensed frequency bands, multiple systems (such as Wi-Fi, radar and other systems) compete for the use of channel resources. When the base station sends the downlink control signaling to the terminal through an unlicensed frequency band, the base station uses the listen before talk (LBT) mechanism to detect the channel status, and then occupies the channel when the channel status is idle. Therefore, it is impossible for the base station to predict when the channel can be occupied. As a result, the method of pre-configuring the detection location of the control signaling is not suitable for unlicensed frequency bands.

Figure 1:
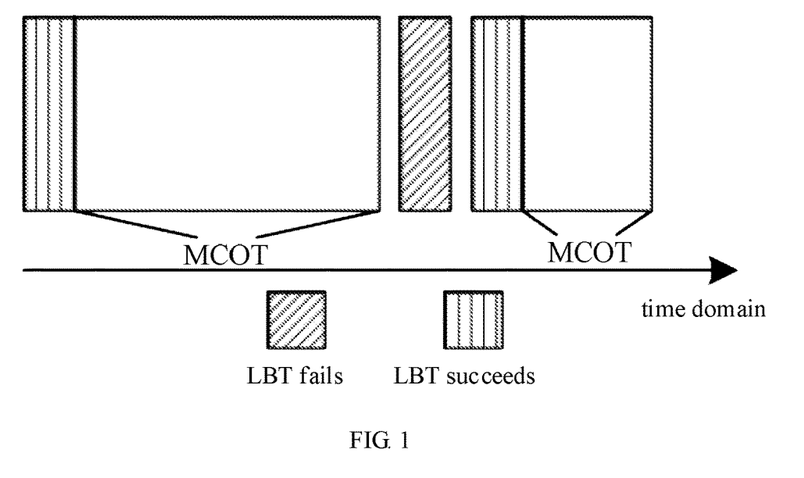
FIG. 1 is a schematic diagram illustrating occupations after detecting a channel status according to the listen before talk (LBT) mechanism provided in an exemplary embodiment of the disclosure.

Optionally, the time that the base station or a sender of other system occupies the channel on the unlicensed frequency band is limited by maximum channel occupancy time (MCOT). That is, after the sender performs one channel status detection and successfully occupies the channel, a maximum channel occupation duration cannot exceed a duration defined by the MCOT. For example, as illustrated in FIG. 1, the sender continuously detects the channel status, and occupies the channel within the duration defined by the MCOT when the LBT passes. When the LBT fails, the sender continues to detect the channel status, and occupies the channel again within the duration defined by the MCOT when the LBT passes.

Figure 2:
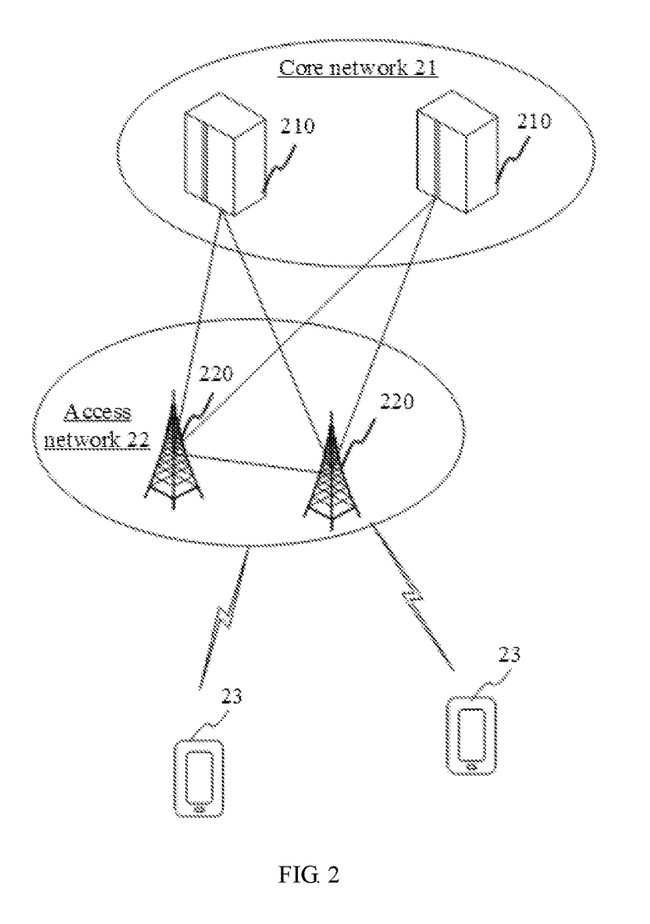
FIG. 2 is a block diagram illustrating a communication system provided in an exemplary embodiment of the disclosure.

FIG. 2 is a block diagram illustrating a communication system provided in an exemplary embodiment of the disclosure. The communication system may include a core network 21, an access network 22, and a terminal 23.

The core network 21 includes multiple core network devices 210. The core network devices 210 include an access and mobility management function (AMF), a session management function (SMF), and a user plane function (UPF), etc. The AMF is used to control access authorities and functions such as handover of the terminal. The SMF is used to provide server continuity and uninterrupted user experience of the server, such as: IP address and anchor point changes.

The access network 22 includes multiple access network devices 220. The access network device 120 may be a base station, which is an apparatus deployed in an access network to provide a wireless communication function for a terminal. The base station may include various forms of macro base stations, micro base stations, relay stations, access points, etc. In systems adopting different wireless access technologies, the names of devices with a base station function may be different. For example, in an LTE (long term evolution) system, it is referred to as eNodeB or eNB. In a 5G NR (new radio) system, it is referred to as gNodeB or gNB. With evolution of communication technologies, possible descriptions of the term "base station" may vary. For convenience of description, in embodiments of the present disclosure, the above apparatus that provides the wireless communication function for the terminal is collectively referred to as an access network device.

The terminal 23 may include various handheld devices, vehicle devices, wearable devices, computing devices with a wireless communication function or other processing devices connected to a wireless modem, as well as various forms of user equipment (UE), mobile stations (MS), terminal devices, etc. For convenience of description, the above devices are collectively referred to as a terminal. The access network device 220 and the terminal 23 communicate with each other through some kind of air interface technology, for example, a Uu interface.

Optionally, during the wireless communication between the aforementioned terminal 23 and the access network device 220, the wireless communication may be performed through a licensed frequency band, or the wireless communication may be performed through an unlicensed frequency band. Optionally, in some embodiments of the present disclosure, that the wireless communication between the terminal 23 and the access network device 220 is performed through an unlicensed frequency band is taken as an example for description.

Figure 3:
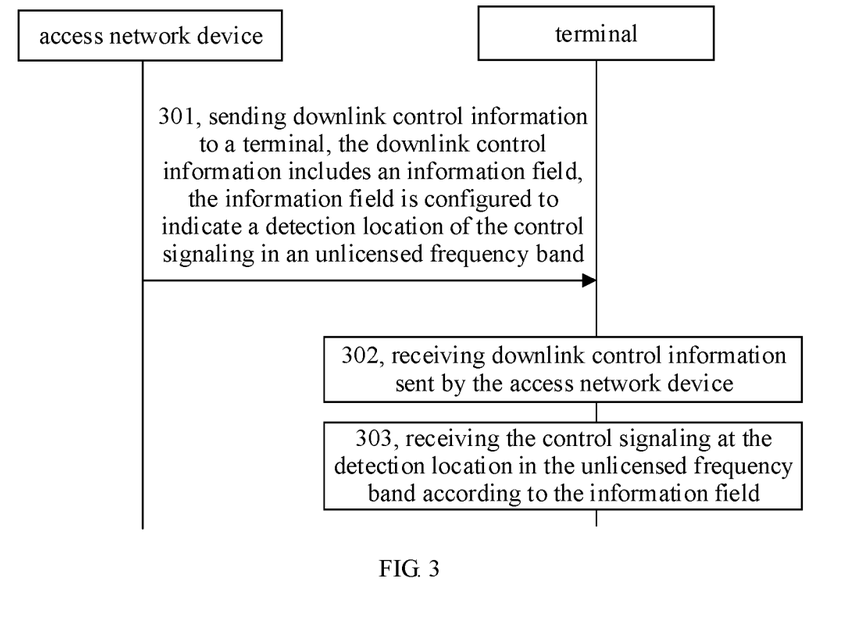
FIG. 3 is a flow chart illustrating a method for detecting control signaling provided in an exemplary embodiment of the disclosure.

FIG. 3 is a flow chart illustrating a method for detecting control signaling provided in an exemplary embodiment of the disclosure. In this embodiment, applying the method to the communication system illustrated in FIG. 2 is taken as an example for description. As illustrated in FIG. 3, the method includes the following.

At block 301, an access network device sends downlink control information to a terminal. The downlink control information includes an information field, and the information field is configured to indicate a detection location of the control signaling in an unlicensed frequency band.

Optionally, the detection location is a possible sending location of the control signaling in the unauthorized frequency band.

Optionally, the detection location corresponds to a time domain unit on a physical downlink control channel where the control signaling is to be detected. Optionally, the time domain unit may be any one of: one symbol, one time slot, one sub frame, and one radio frame. In some embodiments of the present disclosure, one symbol is used as a basic time domain unit as an example for description.

Optionally, the access network device performs channel status detection on the physical downlink control channel of the unlicensed frequency band. Optionally, the channel status detection is performed through a clear channel assessment (CCA). Optionally, in the CCA mode, energy is detected through energy detection (ED). When the energy does not exceed an ED threshold, the channel status is reported as idle, and the information field is generated based on the detection result. Optionally, a channel detection result includes idle or busy. A time domain unit with a detection result being idle is the possible time domain unit where the access network device may send the control signaling to the terminal.

Optionally, the information field includes at least one of the following information fields.

First: a bitmap of fixed length. Each bit in bitmap of the fixed length corresponds to a time domain unit. The bit is used to represent whether to detect the control signaling at the corresponding time domain unit.

Second: indication information. The indication information is used to indicate target configuration information in a configuration information set. The configuration information set includes one or more pieces of configuration information. The configuration information is used to represent the time domain unit where the control signaling is to be detected on the PDCCH.

At block 302, the terminal receives the downlink control information sent by the access network device.

Optionally, the access network device sends the downlink control information to the terminal through a licensed frequency band, or the access network device sends the downlink control information to the terminal through an unlicensed frequency band.

At block 303, the terminal receives the control signaling at the detection location in the unlicensed frequency band according to the information field.

Optionally, the terminal receives the control signaling at the detection location in the unlicensed frequency band of the PDCCH according to the information field.

In conclusion, with the method provided in the embodiments, by adding the information field for indicating the detection location in the unlicensed frequency band of the control signaling in the downlink control information, the terminal receives the control signaling from the physical downlink control channel according to the information field, thereby the terminal realizes the data exchange with the base station according to the control signaling. The terminal may also accurately receive the control signaling on the unlicensed frequency band, and the wireless communication between the terminal and the base station is realized through the unlicensed frequency band.

It is notable that, in embodiments of the disclosure, the steps executed by the access network device may be individually implemented as a method for detecting control signaling at the access network device side, and the steps executed by the terminal may be individually implemented as a method for detecting control signaling at the terminal side.

Figure 4:
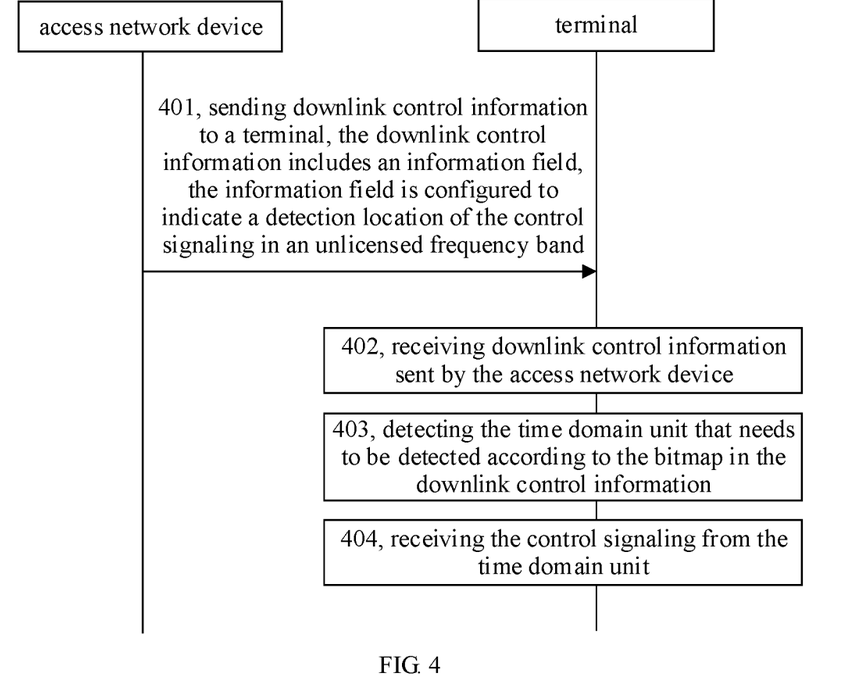
FIG. 4 is a flow chart illustrating a method for detecting control signaling provided in another exemplary embodiment of the disclosure.

In an optional embodiment, the foregoing information field includes a bitmap of fixed length. FIG. 4 is a flow chart illustrating a method for detecting control signaling provided in another exemplary embodiment of the disclosure. Applying the method to the communication system illustrated in FIG. 2 is taken as an example for description. As illustrated in FIG. 4, the method includes the following.

At block 401, an access network device sends downlink control information to a terminal. The downlink control information includes an information field, and the information field is configured to indicate a detection location of the control signaling in an unlicensed frequency band.

Optionally, the detection location is a possible sending location of the control signaling in the unauthorized frequency band.

Optionally, the information field includes a bitmap of fixed length. Each bit in the bitmap of the fixed length corresponds to a time domain unit. For example, each bit in bitmap of the fixed length corresponds to a symbol. The bit is used to represent whether to detect the control signaling at the corresponding time domain unit.

Optionally, each bit in the bitmap of the fixed length corresponds to a time domain unit, and the bit is used to represent whether to detect the control signaling at the corresponding time domain unit in an unlicensed frequency band through different values. Optionally, when a value of the bit is the first value, it means that the control signaling is to be detected at the time domain unit corresponding to the bit, and when the value of the bit is the second value, it means that the control signaling is not to be detected at the time domain unit corresponding to the bit.

Illustratively, for example, the first value is 1 and the second value is 0. When the value of the bit is 1, it means that the control signaling is to be detected at the time domain unit corresponding to the bit. When the value of the bit is 0, it means that the control signaling is not to be detected at the time domain unit corresponding to the bit.

Figure 5:
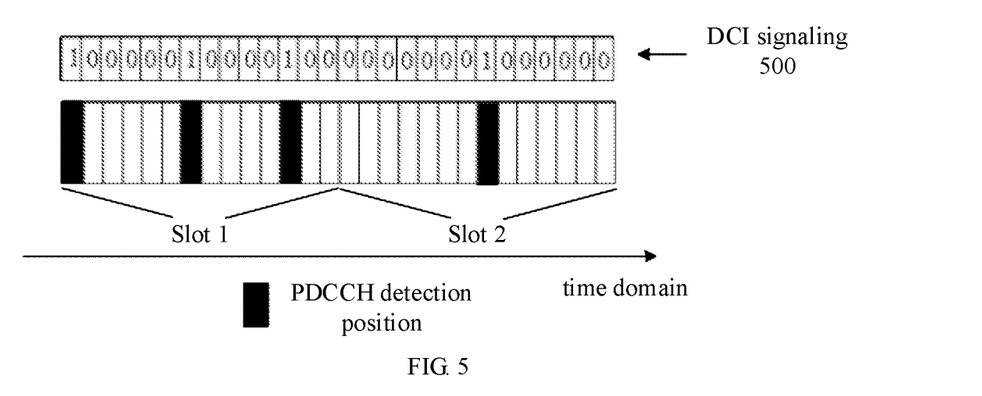
FIG. 5 is a schematic diagram illustrating detecting a physical downlink control channel (PDCCH) according to a bitmap of fixed length provided in an exemplary embodiment of the disclosure.

Illustratively, as illustrated in FIG. 5, a bitmap of DCI 500 includes 28 bits, and each bit corresponds to one symbol. If one slot includes 14 symbols, the first 14 bits correspond to slot1, and the last 14 bits correspond to slot2, each bit corresponds to a value of 0 or 1. When a value of a bit is 1, it means that the control signaling is to be detected at the symbol corresponding to the bit, and when a value of a bit is 0, it means that the control signaling is not to be detected at the symbol corresponding to the bit. As illustrated in FIG. 5 the values of the respective bits in the bitmap are "10000010000100000000001000000" in turn, which corresponds to the time domain units of the physical downlink control channel. The time domain units where the control signaling is to be detected are the first symbol, the seventh symbol, and the twelfth symbol of slot1, and the eighth symbol of slot2.

Optionally, the access network device predefines a format for sending the DCI. Alternatively, the access network device predefines multiple formats for sending the DCI, and selects a DCI format to be used in the wireless communication with the terminal from the multiple DCI formats according to a size of the MCOT for performing. The length of the information fields contained in the DCI of different formats are different. Optionally, a DCI suitable for a size of the MCOT is selected according to the size of the MCOT. For example, the size of the MCOT is 10 slots, then the length of DCI is the length of an information field that contains 10 slots. For example, each slot includes 14 symbols, and each symbol corresponds to one bit, then the length of the DCI may be the length that contains 140 bit information.

Optionally, the information length of the DCI includes the information length of the bitmap of fixed length. For example, the DCI includes a 28-bit bitmap.

Optionally, the DCI also includes other fields besides the bitmap. For example, the DCI0 also includes a flag bit distinguished by format 0 and format 1A, a frequency modulation flag bit, etc. Optionally, the DCI also includes a redundant bit.

At block 402, the terminal receives the downlink control information sent by the access network device.

Optionally, the terminal receives the DCI sent by the access network device through a licensed frequency band or an unlicensed frequency band, and reads the value of each bit of the bitmap in the DCI.

Optionally, after the access network device completes the channel status detection on the unlicensed frequency band, the access network device may send the DCI to the terminal through a link on a licensed frequency band, and indicate the result of the channel status detection of the access network device on the unlicensed frequency band through the DCI. Or, after the access network device completes the channel status detection on the unlicensed frequency band, the access network device can send information to the terminal through a link on the unlicensed frequency band. For example, the DCI is sent to the terminal through the unlicensed frequency band, and the result of the channel status detection of the access network device on the licensed frequency band is indicated through the DCI.

At block 403, the terminal detects the time domain unit to be detected according to the bitmap in the downlink control information.

Optionally, each bit in the bitmap of fixed length corresponds to one time domain unit, and the bit is used to indicate whether to detect the control signaling at the corresponding time domain unit through different values.

Optionally, when a value of a bit is the first value, it means that the control signaling is to be detected at the time domain unit corresponding to the bit. When the value of the bit is the second value, it means that the control signaling is not to be detected at the time domain unit corresponding to the bit.

Illustratively, for example, the first value is 1 and the second value is 0. When the value of the bit is 1, it means that the control signaling is to be detected at the time domain unit corresponding to the bit. When the value of the bit is 0, it means that the control signaling is not to be detected at the time domain unit corresponding to the bit.

Optionally, the fixed length of the above-mentioned bitmap may be predefined, or may be pre-configured to the terminal by the access network device. For example: the access network device sends first configuration signaling to the terminal. The first configuration signaling is used to configure the fixed length. The first configuration signaling includes at least one of: radio resource control (RRC) signaling, media access control (MAC) control unit (CE) signaling, and physical layer signaling.

Figure 6:
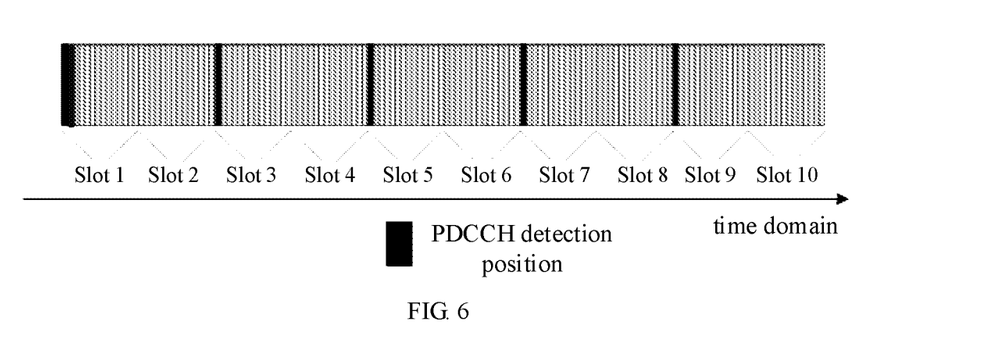
FIG. 6 is a schematic diagram illustrating detecting a physical downlink control channel (PDCCH) according to a bitmap of fixed length provided in another exemplary embodiment of the disclosure.

Optionally, the channel occupation by the access network device is limited by the MCOT. The length of the information field in the DCI may vary with the size of the MCOT. For example, the size of the MCOT is 10 slots, each slot includes 14 symbols, and each symbol corresponds to a 1-bit character in the bitmap, then the 140-bit bitmap can be included in the DCI. Optionally, when a time domain size corresponding to the length of the information field in the DCI is smaller than the size of the MCOT, the access network device may send the DCI to indicate a detection location in one MCOT. For example, the length of the bitmap in the DCI is 28 bits, which corresponds to 28 symbols, i.e., corresponding to 2 slots, and the size of the MCOT is 10 slots. Then, the access network device may periodically send the DCI 5 times to indicate the detection location in one MCOT. Illustratively, as illustrated in FIG. 6, the size of the MCOT is 10 slots. If the length of the bitmap in the DCI is 28 bits, which corresponds to 28 symbols, i.e., corresponding to 2 slots, the detection location may be indicated by sending DCI 5 times. If the length of the bitmap in the DCI is 140 bit, which corresponds to 140 symbols, i.e., corresponding to 10 slots, the access network device sends the DCI to the terminal to indicate the detection location in one MCOT.

Optionally, when the time domain size corresponding to the information field in the DCI is greater than the MCOT, the terminal may determine available information in the DCI based on a predefined rule or by receiving indication information sent by the access network device. For example: the time domain corresponding to the information field in the DCI is 5 slots, and the length of the MCOT is 2 slots. It is pre-defined that the indication information on the fields corresponding to the top 2 slots count from the high location in the information field in the DCI is available indication information.

At block 404, the terminal receives the control signaling from the time domain unit.

Optionally, the terminal detects the control signaling according to a time domain unit in the physical downlink control channel, the time domain unit corresponds to the time domain unit to be detected. When the control signaling is detected, the terminal receives the control signaling in the time domain unit.

Optionally, the terminal receives data from the PDCCH through the indication of the control signaling, thereby realizing data exchange with the access network device.

In conclusion, with the method for detecting control signaling provided in the embodiments, by adding the information field for indicating the detection location in the unlicensed frequency band of the control signaling in the downlink control information, the terminal receives the control signaling from the physical downlink control channel according to the information field, thereby the terminal realizes the data exchange with the base station according to the control signaling. The terminal may also accurately receive the control signaling on the unlicensed frequency band, and the wireless communication between the terminal and the base station is realized through the unlicensed frequency band.

With the method provided in the embodiments, by adding the bitmap for indicating the detection location in the unlicensed frequency band in the DCI, whether to detect the time domain unit or not is indicated by different values of the bits in the bitmap, thereby instructing the terminal to receive the control signaling from the PDCCH according to the value of the bit, so that the terminal can accurately receive the control signaling on the unlicensed frequency band, and the wireless communication between the terminal and the base station is realized through the unlicensed frequency band.

Figure 7:
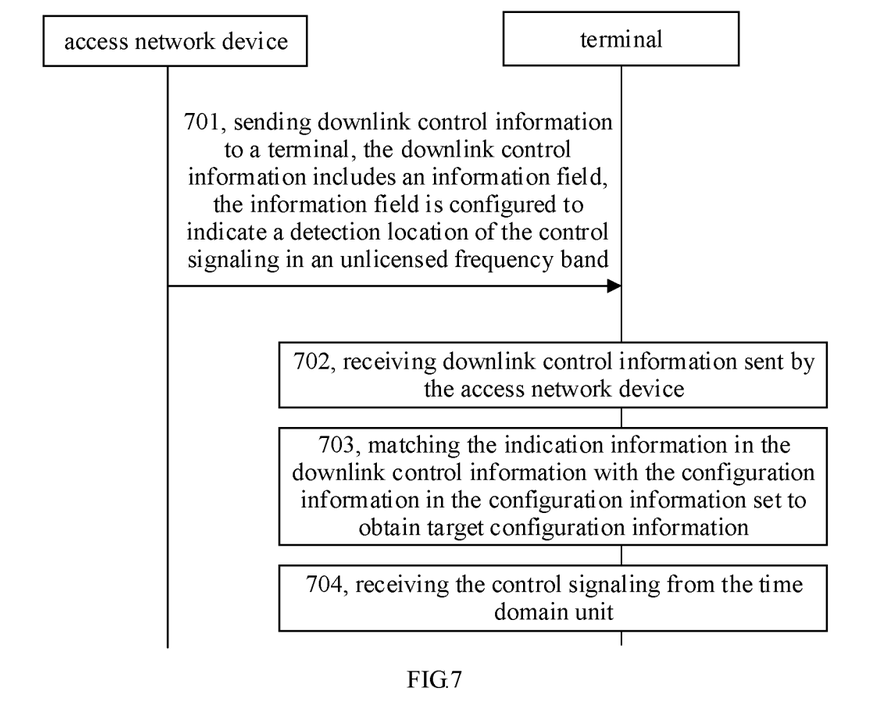
FIG. 7 is a flow chart illustrating a method for detecting control signaling provided in another exemplary embodiment of the disclosure.

In an optional embodiment, the above-mentioned information field includes indication information. FIG. 7 is a flow chart illustrating a method for detecting control signaling provided in another exemplary embodiment of the disclosure. Applying the method to the communication system illustrated in FIG. 2 is taken as an example for description. As illustrated in FIG. 7, the method includes the following.

At block 701, an access network device sends downlink control information to a terminal. The downlink control information includes an information field, and the information field is configured to indicate a detection location of the control signaling in an unlicensed frequency band.

Optionally, the detection location is a possible sending location of the control signaling in the unauthorized frequency band.

Optionally, the information field includes indication information. The indication information is configured to indicate target configuration information in a configuration information set. The configuration information set includes one or more pieces of configuration information. The configuration information is configured to represent the time domain unit where the control signaling is to be detected on a physical downlink control channel.

Optionally, the indication information includes one or more identifications of the target configuration information. The one or more identifications have correspondences with the target configuration information in the configuration information set.

Optionally, the correspondences between the target configuration information in the configuration information set and the one or more identifications are pre-defined in the access network device, i.e., correspondences given in a protocol.

Optionally, the correspondences between the target configuration information and the one or more identifications may be pre-configured for the terminal by the access network device. For example, the access network device sends the second configuration signaling to the terminal. The second configuration signaling is used to indicate the correspondences between the target configuration information and the one or more identifications. The second configuration signaling includes at least one of: RRC signaling, MAC CE signaling, and physical layer signaling.

Optionally, the correspondence relationships between the identifications and the configuration information may refer to the following Table 1.

TABLE 1

| identification | configuration information |
| --- | --- |
| 1 | detection location of the first slot |
| 2 | detection location of the first slot; detection location of the second slot |
| 3 | detection location of the first slot; detection location of the second slot; detection location of the third slot; detection location of the fourth slot |
| 4 | detection location of the first slot; detection location of the second slot; detection location of the third slot; detection location of the fourth slot; detection location of the fifth slot; detection location of the sixth slot; detection location of the seventh slot; detection location of the eighth slot |

Optionally, the identification in the DCI has a corresponding relationship with the configuration information in Table 1. Illustratively, when the indication information in the DCI is 00, it means that the detection location indicated in the DCI corresponds to the configuration information in the identification 1, i.e., the detection location of the first slot. When the indication information in the DCI is 01, it means that the detection location indicated in the DCI corresponds to the configuration information in the identification 2, i.e., the detection locations of the first slot and the second slot. When the indication information of the DCI is 10, it means that the detection location indicated in the DCI corresponds to the configuration information in the identification 3, i.e., the detection locations of the first slot, the second slot, the third slot, and the fourth slot. When the indication information in the DCI is 11, it means that the detection location indicated in the DCI corresponds to the configuration information in the identification 4, i.e., the detection locations of the first slot, the second slot, the third slot, the fourth slot, the fifth slot, the sixth slot, the seventh slot and the eighth slot.

It is notable that the configuration information sets applied to different terminals may be different or the same.

At block 702, the terminal receives downlink control information sent by the access network device.

Optionally, the terminal receives the DCI sent by the access network device through a licensed frequency band or an unlicensed frequency band, and reads the indication information in the DCI.

At block 703, the terminal matches the indication information in the downlink control information with the configuration information in the configuration information set to obtain target configuration information.

Illustratively, for example, descriptions are given in combination with the configuration information set shown in Table 1. The indication information in the DCI includes "01", 01 is used to indicate an identification, then the indication information is matched with the configuration information set to obtain the configuration information corresponding to the identification 2 matching the indication information 01. As shown in the above table, the configuration information corresponding to the identification 2 is "detection location of the first slot, the detection location of the second slot". Then the terminal detects the control signaling at the corresponding locations according to the detection locations of the first slot and the second slot indicated in the configuration information.

At block 704, the terminal receives the control signaling from the time domain unit.

Optionally, the terminal detects the control signaling according to a time domain unit in the physical downlink control channel, the time domain unit corresponds to the time domain unit to be detected. When the control signaling is detected, the terminal receives the control signaling in the time domain unit.

Optionally, the terminal realizes interactions such as receiving data, sending data, and receiving control signaling from the PDCCH through the indication of the control signaling, thereby realizing data exchange with the access network device.

In conclusion, with the method for detecting control signaling provided in the embodiments, by adding the information field for indicating the detection location in the unlicensed frequency band of the control signaling in the downlink control information, the terminal receives the control signaling from the physical downlink control channel according to the information field, thereby the terminal realizes the data exchange with the base station according to the control signaling. The terminal may also accurately receive the control signaling on the unlicensed frequency band, and the wireless communication between the terminal and the base station is realized through the unlicensed frequency band.

With the method provided in the embodiments, by adding the indication information for indicating the detection location in the PDCCH in the DCI, and mapping the indication information to the target configuration information in the configuration information set, the terminal is indicated to receive the control signaling from the PDCCH according to the configuration of the target configuration information, so that the terminal can accurately receive the control signaling on the unlicensed frequency band, and the wireless communication between the terminal and the base station is realized through the unlicensed frequency band.

Figure 8:
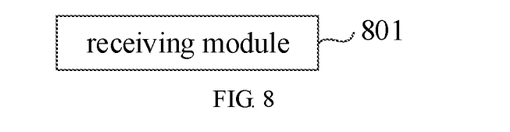
FIG. 8 is a block diagram illustrating an apparatus for detecting control signaling provided in an exemplary embodiment of the disclosure.

FIG. 8 is a block diagram illustrating an apparatus for detecting control signaling provided in an exemplary embodiment of the disclosure. The apparatus may be implemented as all or a part of a terminal by a software, a hardware or a combination thereof. The apparatus includes the following.

A receiving module 801 is configured to receive downlink control information. The downlink control information includes an information field, and the information field is configured to indicate a detection location of the control signaling in an unlicensed frequency band.

The receiving module 801 is further configured to receive the control signaling at the detection location in the unlicensed frequency band according to the information field.

The receiving module 801 may be a hardware device such as a radio frequency antenna, which is used to implement the steps related to receiving.

In an optional implementation, the information field includes a bitmap of fixed length, and each bit in the bitmap of the fixed length corresponds to a time domain unit.

The bit is configured to represent whether to detect the control signaling at a corresponding time domain unit.

In an optional implementation, in response to a value of the bit being a first value, the bit represents detecting the control signaling at the time domain unit corresponding to the bit.

In response to the value of the bit being a second value, the bit represents not detecting the control signaling at the time domain unit corresponding to the bit.

In an optional implementation, the receiving module 801 is further configured to receive first configuration signaling, the first configuration signaling being configured to configure the fixed length.

The first configuration signaling includes at least one of: RRC signaling, MAC CE signaling, and physical layer signaling.

In an optional implementation, the information field includes indication information.

The indication information is configured to indicate target configuration information in a configuration information set.

The configuration information set includes one or more pieces of configuration information, the configuration information is configured to represent the time domain unit where the control signaling is to be detected on a physical downlink control channel.

In an optional implementation, the indication information includes an identification of the target configuration information. The identification has correspondence with the target configuration information in the configuration information set.

In an optional implementation, the correspondence between configuration information in the configuration information set and identifications are correspondence predefined in a terminal.

In an optional implementation, the receiving module 801 is further configured to receive second configuration signaling, the second configuration signaling being configured to configure the correspondence between the configuration information and the identification.

The second configuration signaling includes at least one of: RRC signaling, MAC CE signaling, and physical layer signaling.

In conclusion, with the apparatus for detecting control signaling provided in the embodiments, by adding the information field for indicating the detection location in the unlicensed frequency band of the control signaling in the downlink control information, the terminal receives the control signaling from the physical downlink control channel according to the information field, thereby the terminal realizes the data exchange with the base station according to the control signaling. The terminal may also accurately receive the control signaling on the unlicensed frequency band, and the wireless communication between the terminal and the base station is realized through the unlicensed frequency band.

Figure 9:
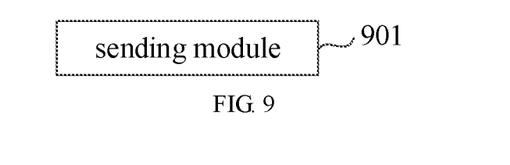
FIG. 9 is a block diagram illustrating an apparatus for detecting control signaling provided in another exemplary embodiment of the disclosure.

FIG. 9 is a block diagram illustrating an apparatus for detecting control signaling provided in another exemplary embodiment of the disclosure. The apparatus may be implemented as all or a part of a terminal by a software, a hardware or a combination thereof. The apparatus includes the following.

A sending module 901 is configured to send downlink control information. The downlink control information includes an information field. The information field is configured to indicate a detection location of the control signaling in an unlicensed frequency band. The detection location is a possible sending location of the control signaling in the unauthorized frequency band.

The sending module 901 be a hardware device such as a radio frequency antenna, which is used to implement the steps related to sending.

In an optional implementation, the information field includes a bitmap of fixed length, and each bit in the bitmap of the fixed length corresponds to a time domain unit.

The bit is configured to represent whether to detect the control signaling at a corresponding time domain unit.

In an optional implementation, in response to a value of the bit being a first value, it represents that the control signaling is to be detected at the time domain unit corresponding to the bit.

In response to the value of the bit being a second value, it represents that the control signaling is not to be detected at the time domain unit corresponding to the bit.

In an optional implementation, the sending module 901 is further configured to send first configuration signaling, the first configuration signaling being configured to configure the fixed length.

The first configuration signaling includes at least one of: RRC signaling, MAC CE signaling, and physical layer signaling.

In an optional implementation, the information field includes indication information.

The indication information is configured to indicate target configuration information in a configuration information set.

The configuration information set includes one or more pieces of configuration information. The configuration information is configured to represent the time domain unit where the control signaling is to be detected on a physical downlink control channel.

In an optional implementation, the indication information includes an identification of the target configuration information, the identification has correspondence with the target configuration information in the configuration information set.

In an optional implementation, the correspondence between configuration information in the configuration information set and identifications are correspondence predefined in an access network device.

In an optional implementation, the sending module 901 is further configured to send second configuration signaling, the second configuration signaling being configured to configure the correspondence between the configuration information and the identification.

The second configuration signaling includes at least one of: RRC signaling, MAC CE signaling, and physical layer signaling.

In conclusion, with the apparatus for detecting control signaling provided in the embodiments, by adding the information field for indicating the detection location in the unlicensed frequency band of the control signaling in the downlink control information, the terminal receives the control signaling from the physical downlink control channel according to the information field, thereby the terminal realizes the data exchange with the base station according to the control signaling. The terminal may also accurately receive the control signaling on the unlicensed frequency band, and the wireless communication between the terminal and the base station is realized through the unlicensed frequency band.

Figure 10:
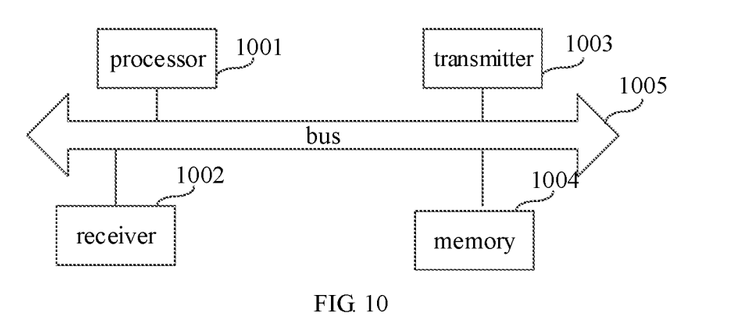
FIG. 10 is a schematic diagram illustrating a terminal provided in an exemplary embodiment of the disclosure.

FIG. 10 is a schematic diagram illustrating a terminal provided in an exemplary embodiment of the disclosure. The terminal includes a processor 1001, a receiver 1002, a transmitter 1003, a memory 1004 and a bus 1005.

The processor 1001 includes one or more processing cores, and the processor 1001 executes various function applications and information processing by running software programs and modules.

The receiver 1002 and the transmitter 1003 may be implemented as a communication component, which may be a communication chip.

The memory 1004 is connected to the processor 1001 through the bus 1005.

The memory 1004 may be configured to store at least one instruction, and the processor 1001 is configured to execute the at least one instruction to implement various actions in the above method embodiments.

In addition, the memory 1004 may be implemented by any type of temporary or non-temporary storage devices or their combination. The temporary or non-temporary storage devices include but are not limited to a magnetic disk or an optical disk, an electrically erasable programmable read-only memory (EEPROM), an electrically programmable read-only memory (EPROM), a static random access memory (SRAM), a read-only memory (ROM), a magnetic memory, a flash memory, a programmable read-only memory (PROM).

In some example embodiments, a non-transitory computer readable storage medium including instructions is further provided, such as a memory including instructions. The above instructions may be executed by the processor of the terminal to implement the above methods for detecting control signaling. For example, the non-transitory computer readable storage medium may be a ROM, a random access memory (RAM), a CD-ROM, a magnetic tape, a floppy disk, an optical data storage device, etc.

A non-transitory computer readable storage medium is further provided. When the instructions in the non-transitory computer readable storage medium are executed by the processor of the terminal, the terminal is caused to execute the method for detecting control signaling.

Figure 11:
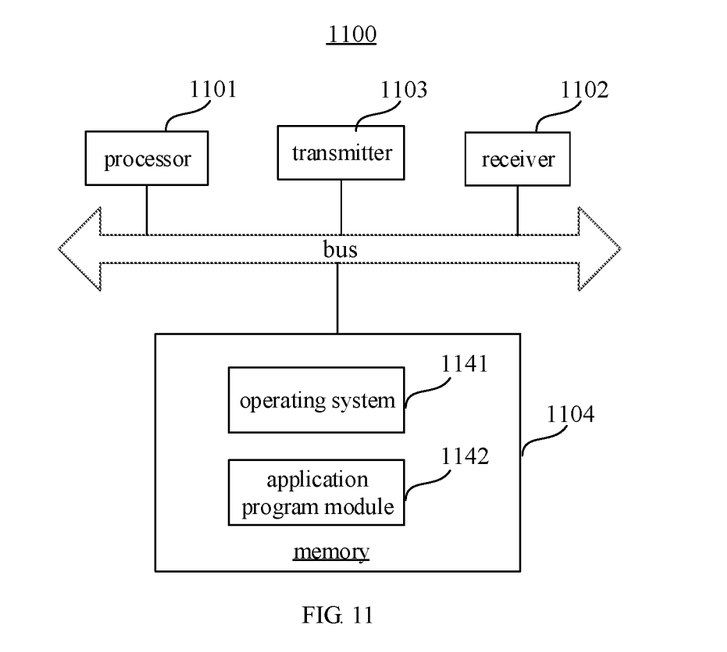
FIG. 11 is a schematic diagram illustrating an access network device provided in an exemplary embodiment of the disclosure.

FIG. 11 is a schematic diagram illustrating an access network device 1100 provided in an exemplary embodiment of the disclosure. The access network device 1100 may be a base station.

The access network device 1100 may include a processor 1101, a receiver 1102, a transmitter 1103 and a memory 1104. The receiver 1102, the transmitter 1103 and the memory 1104 are connected to the processor 1101 through a bus respectively.

The processor 1101 includes one or more processing cores, and the processor 1101 executes the methods executed by the access network device in the method for detecting control signaling provided in embodiments of the disclosure by running software programs and modules. The memory 1104 may be configured to store software programs and modules. Specifically, the memory 1104 may store an operating system 11041, and an application program module 1142 required by at least one function. The receiver 1102 is configured to receive communication data sent by other devices, and the transmitter 1103 is configured to send communication data to other devices.

An example embodiment of the disclosure further provides a system (also called as a communication system) for detecting control signaling, and the system includes a terminal and an access network device.

The terminal includes an apparatus for detecting control signaling according to the embodiment as illustrated in FIG. 8.

The access network device includes an apparatus for detecting control signaling in the embodiment as illustrated in FIG. 9.

An example embodiment of the disclosure further provides a system (also called as a communication system) for detecting control signaling, and the system includes a terminal and an access network device.

The terminal includes a terminal according to the embodiment as illustrated in FIG. 10.

The access network device includes the access network device in the embodiment as illustrated in FIG. 11.

An example embodiment of the disclosure further provides a computer readable storage medium with at least one instruction, at least one program, a set of codes and a set of instructions stored thereon. The at least one instruction, the at least one program, the set of codes or the set of instructions are loaded and executed by the processor to implement the actions executed by the terminal or by the access network device in the method for detecting control signaling as described in the above method embodiments.

It is understood that in the present disclosure, "multiple" refers to two or more, and other quantifiers are similar. In addition, it is noted that "and/or" in the text only describes a relation of the related objects and indicates three relations, for example, "A and/or B" indicates three conditions, i.e., A exists alone, A and B exist simultaneously, and B exists alone. The character "/" generally indicates that it is either the former related object or the latter related object.

Those skilled in the art easily think of other embodiments of the present disclosure after considering the description and practicing the present disclosure disclosed herein. The present disclosure is intended to cover any variations, uses, or adaptive changes that follow the general principles of the present disclosure and include common general knowledge or customary technical means in the technical field not disclosed in the present disclosure. The description and examples are to be considered exemplary only, and the true scope and spirit of the present disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for detecting control signaling, comprising:
   receiving downlink control information, wherein the downlink control information includes an information field, and the information field is configured to indicate a detection location of the control signaling in an unlicensed frequency band; and
   receiving the control signaling at the detection location in the unlicensed frequency band according to the information field;
   wherein the information field comprises indication information;
   the indication information is configured to indicate target configuration information in a configuration information set;
   the configuration information set comprises one or more pieces of configuration information, the configuration information is configured to represent the time domain unit where the control signaling is to be detected on a physical downlink control channel;
   the indication information comprises one or more identifications of the target configuration information, the one or more identifications have correspondences with the target configuration information in the configuration information set.

2. The method as claimed in claim 1, wherein,
   the information field comprises a bitmap of fixed length, and each bit in the bitmap of the fixed length corresponds to a time domain unit;
   wherein the bit is configured to represent whether to detect the control signaling at a corresponding time domain unit.

3. The method as claimed in claim 2, wherein,
   in response to a value of the bit being a first value, the bit represents detecting the control signaling at the time domain unit corresponding to the bit;

in response to the value of the bit being a second value, the bit represents not detecting the control signaling at the time domain unit corresponding to the bit.

4. The method as claimed in claim 2, further comprising:
receiving first configuration signaling, the first configuration signaling being configured to configure the fixed length;
wherein, the first configuration signaling comprises at least one of: radio resource control (RRC) signaling, media access control (MAC) control unit (CE) signaling, and physical layer signaling.

5. The method as claimed in claim 1, wherein the correspondences between the target configuration information in the configuration information set and the one or more identifications are pre-defined in a terminal.

6. The method as claimed in claim 1, further comprising:
receiving second configuration signaling, the second configuration signaling being configured to configure the one or more correspondences between the target configuration information in the configuration information set and the one or more identifications;
wherein, the second configuration signaling comprises at least one of: radio resource control (RRC) signaling, media access control (MAC) control unit (CE) signaling, and physical layer signaling.

7. A method for detecting control signaling, comprising:
sending downlink control information, wherein the downlink control information includes an information field, the information field is configured to indicate a detection location of the control signaling in an unlicensed frequency band, and the detection location is a possible sending location of the control signaling in an unauthorized frequency band, wherein the information field comprises indication information;
the indication information is configured to indicate target configuration information in a configuration information set;
the configuration information set comprises one or more pieces of configuration information, the configuration information is configured to represent the time domain unit where the control signaling is to be detected on a physical downlink control channel;
the indication information comprises one or more identifications of the target configuration information, the one or more identifications have correspondences with the target configuration information in the configuration information set.

8. The method as claimed in claim 7, wherein,
the information field comprises a bitmap of fixed length, and each bit in the bitmap of the fixed length corresponds to a time domain unit;
wherein the bit is configured to represent whether to detect the control signaling at a corresponding time domain unit.

9. The method as claimed in claim 8, wherein,
in response to a value of the bit being a first value, the bit represents detecting the control signaling at the time domain unit corresponding to the bit;
in response to the value of the bit being a second value, the bit represents not detecting the control signaling at the time domain unit corresponding to the bit.

10. The method as claimed in claim 8, further comprising:
sending first configuration signaling, the first configuration signaling being configured to configure the fixed length;
wherein, the first configuration signaling comprises at least one of: radio resource control (RRC) signaling, media access control (MAC) control unit (CE) signaling, and physical layer signaling.

11. The method as claimed in claim 7, wherein the correspondences between the target configuration information in the configuration information set and the one or more identifications are pre-defined in an access network device.

12. The method as claimed in claim 7, further comprising:
sending second configuration signaling, the second configuration signaling being configured to configure the one or more correspondences between the target configuration information in the configuration information set and the one or more identifications;
wherein, the second configuration signaling comprises at least one of: radio resource control (RRC) signaling, media access control (MAC) control unit (CE) signaling, and physical layer signaling.

13. A terminal, comprising:
a processor; and
a transceiver coupled to the processor;
wherein the processor is configured to load and execute executable instructions to implement a method for detecting control signaling, the method comprising:
receiving downlink control information, wherein the downlink control information includes an information field, and the information field is configured to indicate a detection location of the control signaling in an unlicensed frequency band; and
receiving the control signaling at the detection location in the unlicensed frequency band according to the information field;
wherein the information field comprises indication information;
the indication information is configured to indicate target configuration information in a configuration information set;
the configuration information set comprises one or more pieces of configuration information, the configuration information is configured to represent the time domain unit where the control signaling is to be detected on a physical downlink control channel;
the indication information comprises one or more identifications of the target configuration information, the one or more identifications have correspondences with the target configuration information in the configuration information set.

14. An access network device, implementing the method as claimed in claim 7, comprising:
a processor; and
a transceiver coupled to the processor;
wherein the processor is configured to load and execute executable instructions to perform the steps of the method for detecting control signaling as claimed in claim 7.

15. A non-transitory computer-readable storage medium having stored therein at least one instruction, at least one program, a code set, or an instruction set, wherein the at least one instruction, the at least one program, the code set, or the instruction set is loaded and executed by a processor to implement the method for detecting control signaling as claimed in claim 1.

16. A non-transitory computer-readable storage medium having stored therein at least one instruction, at least one program, a code set, or an instruction set, wherein the at least one instruction, the at least one program, the code set, or the instruction set is loaded and executed by a processor to implement the method for detecting control signaling as claimed in claim 7.

* * * * *